United States Patent [19]
Ehrick

[11] Patent Number: 5,982,071
[45] Date of Patent: Nov. 9, 1999

[54] COOLING OF ELECTRICAL MACHINERY

[75] Inventor: Stephen D. Ehrick, Yorba Linda, Calif.

[73] Assignee: Able Corporation, Yorba Linda, Calif.

[21] Appl. No.: 09/133,418

[22] Filed: Aug. 13, 1998

[51] Int. Cl.⁶ .................................................. H02K 1/00
[52] U.S. Cl. .............................. 310/216; 310/58; 310/61; 310/62; 310/63; 310/52; 310/227
[58] Field of Search .............................. 310/58, 216, 227, 310/61, 62, 63, 52

[56] References Cited

U.S. PATENT DOCUMENTS

| | | |
|---|---|---|
| 1,529,993 | 3/1925 | Ehrmann . |
| 1,882,487 | 11/1932 | Dupont . |
| 2,735,950 | 2/1956 | Brown . |
| 3,009,072 | 11/1961 | Mossay . |
| 3,471,727 | 10/1969 | Sedlock et al. . |
| 3,531,668 | 9/1970 | Cathey . |
| 4,102,040 | 7/1978 | Rich . |
| 4,912,350 | 3/1990 | Parshall et al. . |
| 4,918,343 | 4/1990 | Heinrich et al. . |
| 5,062,330 | 11/1991 | Trautmann et al. . |
| 5,173,629 | 12/1992 | Peters . |
| 5,214,325 | 5/1993 | Matson et al. ............................. 310/58 |
| 5,331,238 | 7/1994 | Johnsen . |
| 5,491,371 | 2/1996 | Ooi . |
| 5,698,913 | 12/1997 | Yagi et al. ................................. 310/58 |
| 5,757,095 | 5/1998 | Ohmi et al. ............................... 310/58 |
| 5,767,602 | 6/1998 | Sargeant .................................. 310/258 |
| 5,789,833 | 8/1998 | Kinoshita et al. ......................... 310/64 |

FOREIGN PATENT DOCUMENTS

| | | |
|---|---|---|
| 521948 | 10/1953 | Belgium . |
| 59-21250 | 2/1984 | Japan . |
| 437176 | 2/1975 | Russian Federation . |
| 694940 | 10/1979 | Russian Federation . |
| 1014093 | 4/1983 | Russian Federation . |

*Primary Examiner*—Nestor Ramirez
*Assistant Examiner*—Thanh Lam
*Attorney, Agent, or Firm*—William W. Haefliger

[57] ABSTRACT

An electrical machine has a stator, and a rotor defining an axis of rotation, the stator including laminations located along that axis, the laminations having protrusions, the protrusions on each lamination being circularly spaced apart about the axis to define cooling air flow passages, and a fan mounted on the rotor to effect flow of cooling air into and through such passages as the rotor rotates.

19 Claims, 3 Drawing Sheets

COOLING OF ELECTRICAL MACHINERY

BACKGROUND OF THE INVENTION

This invention relates generally to the cooling of electrical machinery, and more particularly to obtaining more efficient heat transfer from laminations used in the stators and rotors of such machinery.

Cooling of electrical machines becomes more difficult when the sizes of stators and rotors is reduced while power handling remains the same, or is not proportionally reduced. There is need for improvements in heat transfer usable in stators and/or rotors, to meet cooling requirements.

This invention represents an improvement with respect to that disclosed in U.S. Pat. No. 5,491,371.

SUMMARY OF THE INVENTION

It is a major object of the invention to provide improved apparatus meeting the above need. Basically the improved electrical machine has a stator and a rotor defining an axis of rotation, and wherein:

a) the stator includes laminations located along that axis, b) the laminations having protrusions, the protrusions on each lamination being circularly spaced apart about that axis to define cooling air flow passages, c) and a fan mounted on the rotor to effect flow of cooling air into and through such passages as the rotor rotates.

Typically and as will be seen, the protrusions are located at the peripheries of the laminations, the machine having a shroud extending closely about the laminations to confine the cooling air flow passages. Also the fan has blading located in generally axial and direct communication with the cooling air flow passages.

Another object is the provision of an annular air flow space located axially between fan blades spaced about the central axis and the protrusions are on the laminations and spaced about that axis. Typically, shroud structure is provided to extend about the machine axis and over the annular air space, the lamination protrusions and the fan blading.

A further object is to provide protrusions that define certain planes which extend at different angles relative to other planes that extend normal to that axis; and wherein the protrusions on successive laminations are staggered.

Yet another object is to provide an electrical machine assembly wherein the rotor shaft carries the fan having blading extending toward the protrusions on one of the laminations, successive laminations extending in an axial row.

These and other objects and advantages of the invention, as well as the details of an illustrative embodiment, will be more fully understood from the following specification and drawings, in which:

DRAWING DESCRIPTION

DETAILED DESCRIPTION

Figure 1:
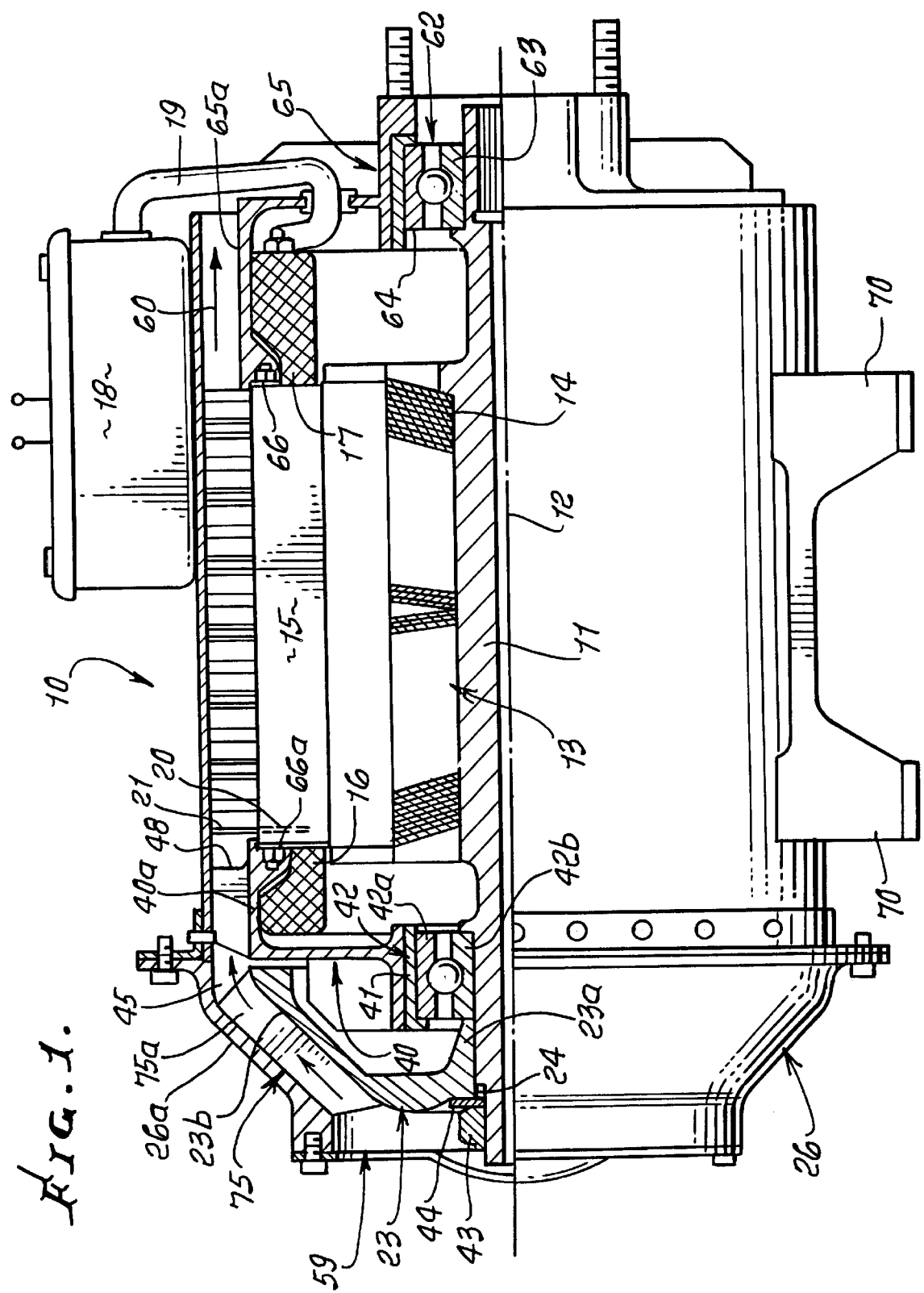
FIG. 1 is a section taken through an electrical machine incorporating the invention.

In FIG. 1 the electrical machine 10, such as a motor, includes a rotary shaft 11 having an axis 12. The shaft carries the rotor 13, which includes electrical windings at 14. The machine also includes an axially elongated stator 15 having electrical windings that extend in generally axial directions, and define end turns as at 16 and 17. An external circuit box 18 has electrical connection via cable 19 with end turn 17. Alternating electrical current supplied to the stator via 18 and 19 causes the rotor to rotate.

Figure 2:
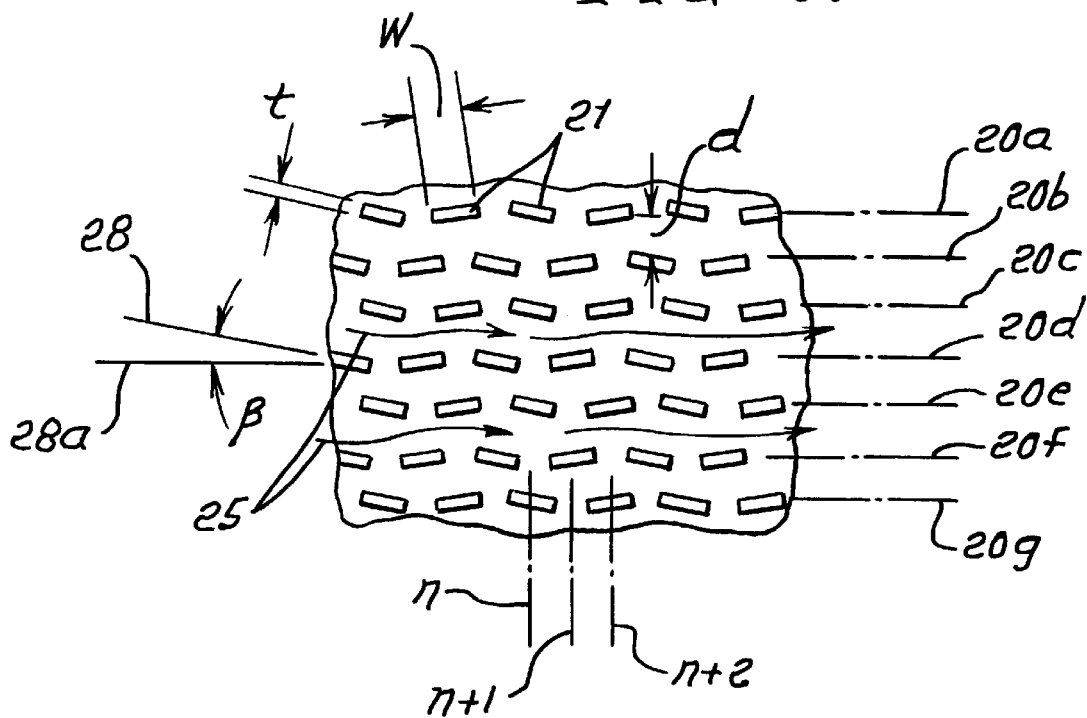
FIG. 2 is a plan view of protrusions as seen when the machine shroud is removed.
Figure 3:
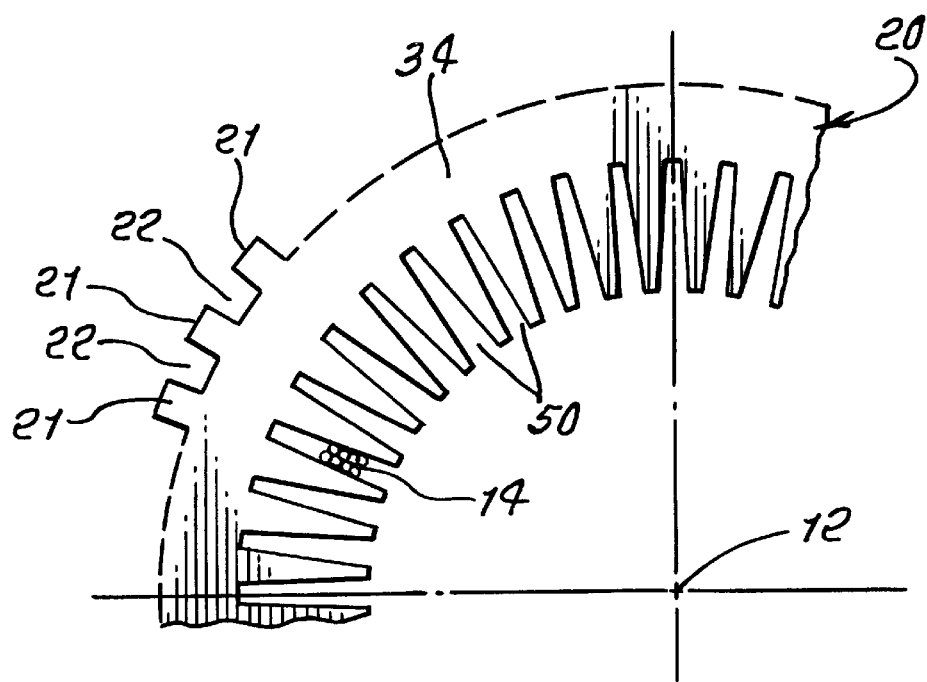
FIG. 3 shows lamination slots and wiring.

The stator has thin plate laminations 20 that extend in an axial row, and that define planes normal to axis 12. As shown in FIG. 3, each lamination has radially extending protrusions as at 21, and which are circularly spaced apart about the axis 12. See gaps 22 between successive protrusions. Those gaps define cooling air flow passages extending generally axially through the sequence of laminations. FIG. 2 shows circularly successive protrusion rows 20a–20g. Protrusions on successive laminations bearing protrusions (see laminations n, n+1, n+2, etc.) axially spaced apart, and preferably staggered. See spacing "d". Also, the flat sides 21a of the protrusions are preferably canted or angled as at β from axial radial planes, where β is between 0° and 20°. There may be other laminations between the protrusion bearing laminations, and which have no protrusions.

A fan 23 is mounted on the rotor at 24 and is operable to effect cooling air flow through such passages, as for example is shown by the flow paths indicated by arrows 25 in FIG. 2. The protrusions are typically and preferably located at the peripheries of the laminations, and a machine shroud 26 extends generally cylindrically closely about the protrusions, whereby cooling air flow is confined within the passages formed by the protrusions.

As seen in FIGS. 2 and 3, the like protrusions have width "w" greater than their thickness "t", and they define planes as at 28 which extend at different angles relative to planes 28a that extend parallel to the axis 12. Such planes are defined by the main extents 34 of the laminations, radially inwardly of the protrusions. Since the protrusions on successive laminations are staggered, in the direction of axis, the cooling air flow passages are serpentine. The sides of the laminations face toward the serpentine air flow paths, indicated at 25 in FIG. 2.

Machine structure 40 extends radially to provide a support 41 for the outer race 42a of a ball bearing assembly 42. The bearing inner race 42b is carried by shaft 11. The fan 23 is located at the side of structure 40 opposite the rotor and stator, as seen in FIG. 1. The fan hub 23a is held attached to the shaft as by nut 43 and clamp ring 44 urging the hub 23a against inner race 42b. Outer extent 23b of the fan extends angularly back over the bearing and toward a ring 40a defined by structure 40.

Angled fan blading 75 including the circularly spaced blades 75a is carried by the fan outer extent 23b. An annular air flow space 45 is located between the rotating blades and the non-rotating protrusions on an end lamination 20. Flow straightening vanes 48 are carried proximate space 45 by ring structure 40a, those vanes being circularly spaced about axis 12. A conical extension 26a of shroud 26 surrounds the blades. Non-rotating vanes 48 straighten the cooling air flow discharged from the blades, for impingement against the protrusion flat sides and circulation through the air flow passages, and against and between successive protrusions, to receive efficient transfer of motor generated heat from the protrusions, as by conduction into the turbulent serpentine flow.

FIG. 3 shows lamination slots 50 spaced about axis 12, to receive wiring 14. Those slots and the wiring extend in generally axial alignment with the fan.

An air entrance to the machine and fan is seen at 59. Cooling air discharges at 60 from the described cooling air passages, and outwardly of the winding end turns 17. A second bearing assembly 62 at the opposite end of the machine from bearing assembly 42 has an inner race 63 supported by the shaft, and an outer race 64 carried by machine structure 65. That structure has outer extent at 65a extending back over the end winding 17, and attached at 66 to the stator. See also attachment of 40a to the stator, at 66a.

Figure 4:
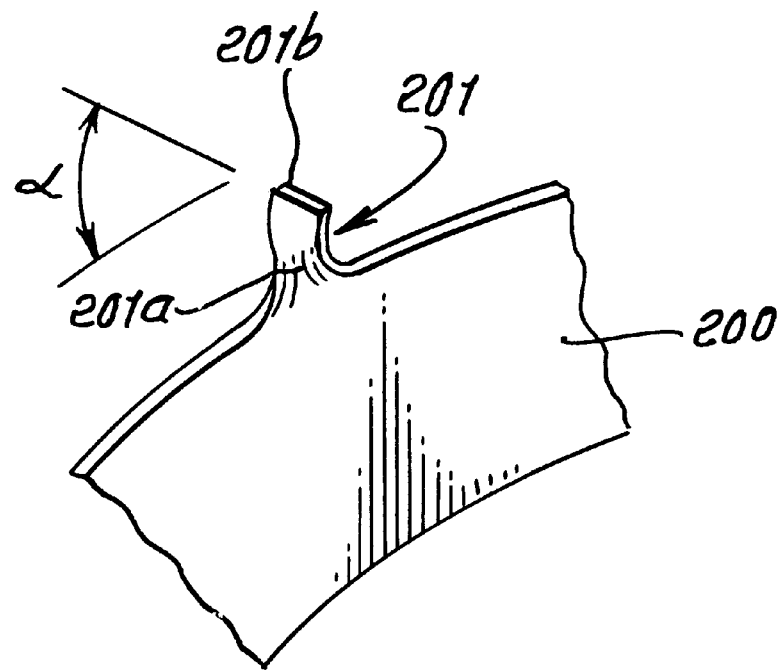
FIG. 4 is a perspective view showing a lamination protrusion twisted out of the plane of the lamination.

FIG. 4 shows a lamination 200, in perspective, with a representative protrusion 201 extending at the periphery of the lamination. The protrusion in the form of a thin, narrow, metallic plate, has been twist deformed at zone 201a near the juncture of the protrusion with the lamination. The angle of twist definition is indicated at $\alpha$, which may typically be between 60° and 80°; i.e. the plane of the outer portion 201b of the protrusion extends at an angle $\alpha$ relative to the plane of the lamination.

Figure 5:
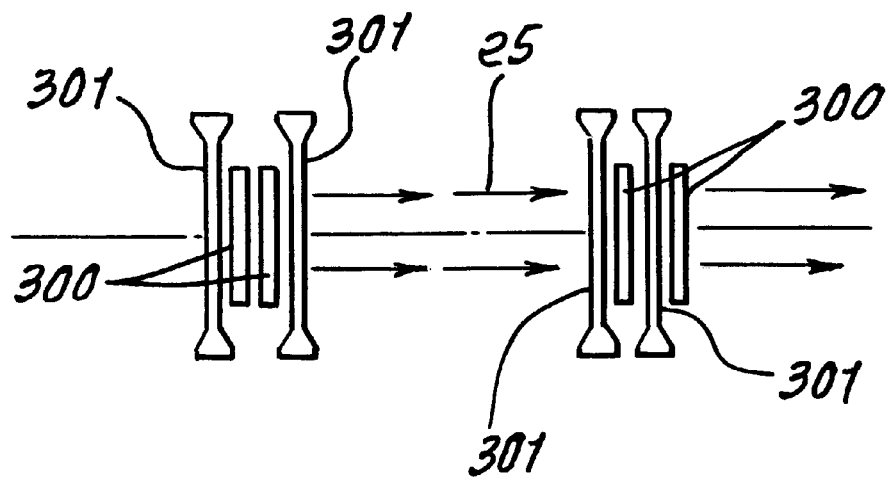
FIG. 5 is a diagram showing variable protrusion density.

The invention also contemplates increasing the density of the protrusions, within a given area as in FIG. 2, in the flow passage in the direction of the arrows 25, in FIG. 2. The reason is that the cooling air flow becomes warmer as it proceeds rightwardly in FIG. 2, whereby heat transfer from the protrusions to the air flow becomes less, unless a greater number of protrusions are employed, per unit of flow space, in a rightward direction in FIG. 2. This effect can be realized by reducing the number of non-protrusion laminations that lie between protrusion bearing laminations, in a rightward direction. See FIG. 5 showing two non-protrusion laminations 300 assembled between the protrusion laminations 301 at a leftward region of the cooling air flow zone (see flow arrows 25); and only one non-protrusion lamination 300 assembled between successive protrusion laminations 301 at a rightward region of the cooling air flow zone.

Another way to create this effect is to increase the number of protrusions around the circumference of the laminations, in the rightward flow direction.

FIG. 2 also shows that protrusions in lamination planes "n" and "n+2" are twisted oppositely from the protrusions in lamination planes "n+1"—i.e. in successive planes of the protrusion bearing laminations, the protrusions are angled or twisted angularly oppositely. This increases air flow turbulence, and enhances heat transfer to the flowing air, for enhanced cooling effect.

Accordingly, the invention provides a very compact electrical machine assembly, capable of adequately cooling the machine despite the small, i.e. compact, overall size of the assembly.

A machine support is indicated at 70.

FIGS. 1–5 show the preferred embodiment of the invention; however, other forms of the invention are contemplated, and are within the scope of one or more claims set forth herein.

I claim:

1. In an electrical machine having a stator, and a rotor defining an axis of rotation, the combination comprising
    a) the stator including laminations located along said axis,
    b) certain of the laminations having protrusions, the protrusions on each lamination being circularly spaced apart about said axis to define cooling air flow passages,
    c) and a fan mounted on the rotor to effect flow of cooling air into and through said passages as the rotor rotates,
    d) the protrusions on said certain laminations being angled relative to planes defined by said certain laminations.

2. The combination of claim 1 wherein the protrusions are located at the peripheries of the laminations, the machine having a shroud extending closely about the protrusions to confine said cooling air flow passages.

3. The combination of claim 2 wherein the fan has blades located in generally axial and direct communication with said cooling air flow passages.

4. The combination of claim 3 including an annular air flow space located axially between the fan blades spaced about said axis and the protrusions on an end lamination and spaced about said axis.

5. The combination of claim 4 wherein the machine includes shroud structure extending about said axis and over said air space, the lamination protrusions, and said blades.

6. The combination of claim 1 wherein said protrusions on successive laminations that bear protrusions, in the direction of said axis, are staggered.

7. The combination of claim 4 wherein said protrusions on successive laminations that bear protrusions, in the direction of said axis, are staggered.

8. The combination of claim 1 wherein the laminations have slots spaced about said axis, the slots being in axial alignment with the fan.

9. The combination of claim 8 including electrical wiring extending through the lamination slots, in radially spaced relation to the protrusions.

10. The combination of claim 1 wherein the protrusions define certain planes which extend at different angles relative to other planes that extend parallel to said axis.

11. The combination of claim 10 wherein the protrusions on laminations spaced apart in the direction of said axis are staggered.

12. The combination of claim 1 wherein the rotor includes a shaft extending axially and carrying the fan, the fan having blading extending toward flow straightening vanes located between the vanes and the protrusions on one of said laminations, the laminations extending in an axial row.

13. In an electrical machine having a stator, and a rotor defining an axis of rotation, the combination comprising
    a) the stator including laminations located along said axis,
    b) certain of the laminations having protrusions, the protrusions on each lamination being circularly spaced apart about said axis to define cooling air flow passages,
    c) and a fan mounted on the rotor to effect flow of cooling air into and through said passages as the rotor rotates,
    d) and wherein the density of the protrusions is increased in the direction of cooling air flow along the stator.

14. The combination of claim 13 wherein others of the laminations do not have protrusions, said other laminations located between said certain laminations, there being a decreased number of said other laminations located between said certain laminations, in the direction of air flow along the stator.

15. The combination of claim 13 wherein there are an increased number of protrusions on the laminations in the direction of air flow along the stator.

16. The combination of claim 13 wherein the protrusions on said certain laminations are twisted out of planes defined by said certain laminations.

17. The combination of claim 16 wherein the degree of twist of said protrusions is between about 60° and 80°.

18. The combination of claim 17 wherein the degree of twist of successive of said certain laminations is angularly positive and negative.

19. The combination of claim 1 wherein the protrusions on said certain laminations have surfaces angled at between 30° and 60° relative to planes defined by said certain laminations.

* * * * *